United States Patent
Stoffels et al.

(10) Patent No.: US 6,932,163 B2
(45) Date of Patent: Aug. 23, 2005

(54) ROOFING SAW WITH LOCKING MECHANISM AND REMOVABLE BEARING SUPPORT

(75) Inventors: Richard B. Stoffels, Eden Prairie, MN (US); John Munoz, Minnetonka, MN (US)

(73) Assignee: Garlock Equipment Company, Minneapolis, MN (US)

( * ) Notice: Subject to any disclaimer, the term of this patent is extended or adjusted under 35 U.S.C. 154(b) by 140 days.

(21) Appl. No.: 10/667,050

(22) Filed: Sep. 22, 2003

(65) Prior Publication Data

US 2005/0061134 A1 Mar. 24, 2005

(51) Int. Cl.⁷ .............................. B23D 51/00; B26D 7/06
(52) U.S. Cl. .............................. 173/24; 173/25; 173/26; 83/745; 83/221; 83/928; 83/DIG. 1; 30/379
(58) Field of Search .......................... 83/745, 928, 795, 83/221, DIG. 1; 30/379; 192/110 B; 173/24, 25, 26

(56) References Cited

U.S. PATENT DOCUMENTS

| | | | | |
|---|---|---|---|---|
| 3,663,060 A | * | 5/1972 | Shatwell et al. | 299/39.3 |
| 3,675,689 A | * | 7/1972 | Rice | 30/379 |
| 4,294,046 A | * | 10/1981 | Damiano | 451/344 |
| 4,353,275 A | * | 10/1982 | Colville | 83/488 |
| 4,445,557 A | * | 5/1984 | Peters, III | 144/336 |
| 4,709,736 A | * | 12/1987 | Bellars | 144/24.12 |
| 4,832,412 A | * | 5/1989 | Bertrand | 299/39.3 |
| 5,813,302 A | * | 9/1998 | Haglund | 83/156 |
| 6,003,570 A | * | 12/1999 | Falatok et al. | 144/24.12 |
| 6,481,324 B1 | * | 11/2002 | Johnston | 83/795 |
| 6,672,348 B2 | * | 1/2004 | Ransom et al. | 144/287 |
| 6,823,765 B2 | * | 11/2004 | Stumpf et al. | 83/471.3 |

* cited by examiner

Primary Examiner—Charles Goodman
(74) Attorney, Agent, or Firm—Alan D. Kamrath; Nikolai & Mersereau, P.A.

(57) ABSTRACT

A saw (10) facilitates cutting of roofing and includes a frame (12) that is mobile on a work surface. A locking mechanism (40) locks the frame (12) into a transport position. Actuating a release lever (60) allows the frame (12) to be adjusted into a working position. A shaft (14) rotatably mounted by first, second and third bearings (74, 75, 76) has saw blades (16, 18) and a pulley (77) for connection with a drive belt (80). The drive belt (80) passes through a hole (79) in the frame (12) to connect to a drive (81) to rotate the shaft (14) and the saw blades (16, 18). The third bearing (76) is mounted to a bearing support (85). The frame (12) has a gap (84) communicating the hole (79) with an exterior edge (78) of the frame (12) proximate the third bearing (76), with the bearing support (85) removably and replaceably mounted to the frame (12) and spanning the gap (84). When the bearing support (85) is removed from the frame (12), the third bearing (76) is void of attachments to the frame (12), and the drive belt (80) may be passed over the access end (70) of the shaft (14) and over the third bearing (76) and into the hole (79) to access the pulley (77) while the first, second and third bearings (74, 75, 76) remain in position on the shaft (14) to expedite drive belt replacement.

20 Claims, 4 Drawing Sheets

ROOFING SAW WITH LOCKING MECHANISM AND REMOVABLE BEARING SUPPORT

BACKGROUND

The present invention generally relates to saws and more particularly to a saw to facilitate cutting of roofing.

Saws for cutting roofing need to have their front end pulled up "out of cut" or into a transport position when the engine is running but no cutting is being performed. Traditionally, lowering the saw back "into cut" or into a working position, as well as holding the saw in the transport position, has been accomplished by moving an adjustment rod by hand which can be cumbersome, especially on heavy twin saws.

Furthermore, changing a drive belt on a traditional roofing saw requires removing the shaft and/or the bearings that supports the shaft to access a pulley. This requires realignment of the shaft upon remounting. Cutting a roofing surface deposits large amounts of debris on the shaft and bearings, and the process of sliding the bearing off the shaft and replacing it is difficult and time-consuming.

Therefore, there is a need to have a saw to facilitate cutting of roofing to overcome deficiencies encountered in prior roofing saws.

SUMMARY

The present invention solves these needs and other problems in the field of saws by providing, in a preferred form, a saw including a frame that is mobile on a work surface. The frame includes a main framework and a transport framework. The transport framework is pivotable in relation to the main framework for adjustment of the framework between a working position and a transport position. An adjustment rod extends between the transport framework and the main framework. The adjustment rod has a pivot end that is pivotably connected to the transport framework and a sliding end that is slideably connected to the main framework. The pivot end causes the adjustment rod to move interdependently with movement of the transport framework relative to the main framework. The sliding end of the adjustment rod slides in contact with the main framework. A locking mechanism is provided and includes an elongated member having a first end and a second end. The second end of the elongated member is pivotably connected to the adjustment rod intermediate the pivot end and the sliding end of the adjustment rod. The first end of the elongated member is slideable and lockable to the main framework. The first end of the elongated member slides relative to the main framework with movement of the adjustment rod. When the first end is locked to the main framework, the sliding movement of the elongated member, and accordingly the adjustment rod, is stopped, and the frame is locked into the transport position. A shaft is rotatably mounted to the frame. A saw blade is mounted on the shaft with rotation of the shaft causing rotation of the saw blade. The saw blade engages and cuts the work surface when the frame is in the working position. The saw blade is repositioned to prevent engagement with the work surface when the frame is locked into the transport position.

In other aspects of the present invention, a saw is provided including a frame that is mobile on a work surface. A shaft is mounted to the frame, with the shaft rotating about a central axis. The shaft has an axial length, an access end and another end along the axial length of the shaft. A saw blade is mounted on the shaft, with rotation of the shaft causing rotation of the saw blade. A first bearing and a second bearing are mounted to the frame and support the shaft. A third bearing is located near the access end of the shaft, with the first bearing located near the other end of the shaft and the second bearing located between the first and third bearings. For rotating the shaft, a pulley is mounted on the shaft between the second bearing and the third bearing for connection with a drive belt. A hole is located in the frame near the pulley, and the drive belt passes through the hole and connects with a drive to rotate the shaft. The frame has an exterior edge near the access end of the shaft. The frame has a gap that extends from the hole in the frame to the exterior edge of the frame to communicate the hole with the exterior edge. A bearing support is provided which spans the gap and is removably and replaceably mounted to the frame. The third bearing is attached to the bearing support. When the bearing support is removed from the frame, the third bearing remains in position on the shaft and has no attachments to the frame. The gap in the frame has a size and shape when the bearing support is removed from the frame which allow the drive belt to be passed around the access end of the shaft and over the third bearing and into the hole while the first, second and third bearings remain in position on the shaft and the first and second bearings remain mounted on the frame to provide ease of replacement of the drive belt.

It is thus an object of the present invention to provide a novel saw.

It is yet another object of the present invention to provide such a novel saw that provides a locking mechanism to securely hold the saw in a transport position.

It is yet another object of the present invention to provide such a novel saw that provides a release lever to release the saw from the transport position and allow adjustment of the saw into a working position.

It is yet another object of the present invention to provide such a novel saw that provides a removable and replaceable bearing support to allow drive belt changes without removing bearings from the shaft and/or realigning the drive shaft.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
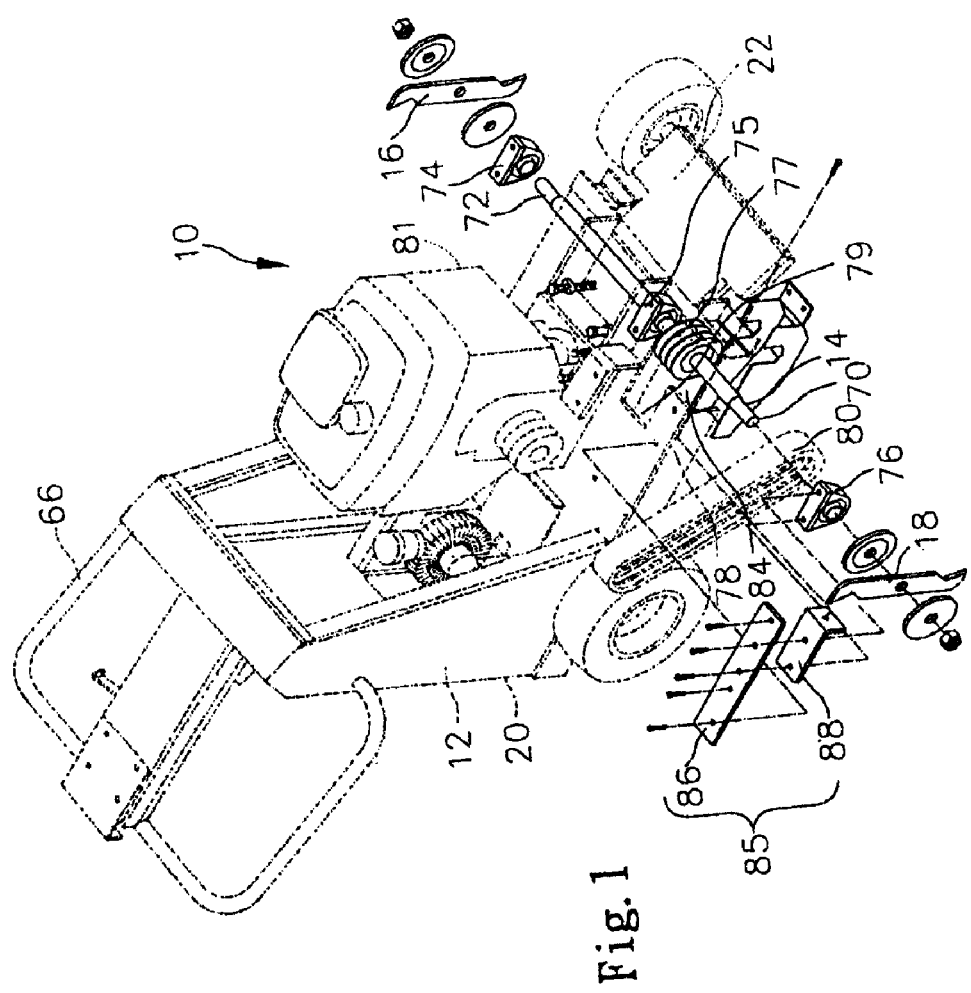
FIG. 1 shows an exploded perspective view of a saw according to the preferred teachings of the present invention.
Figure 2:
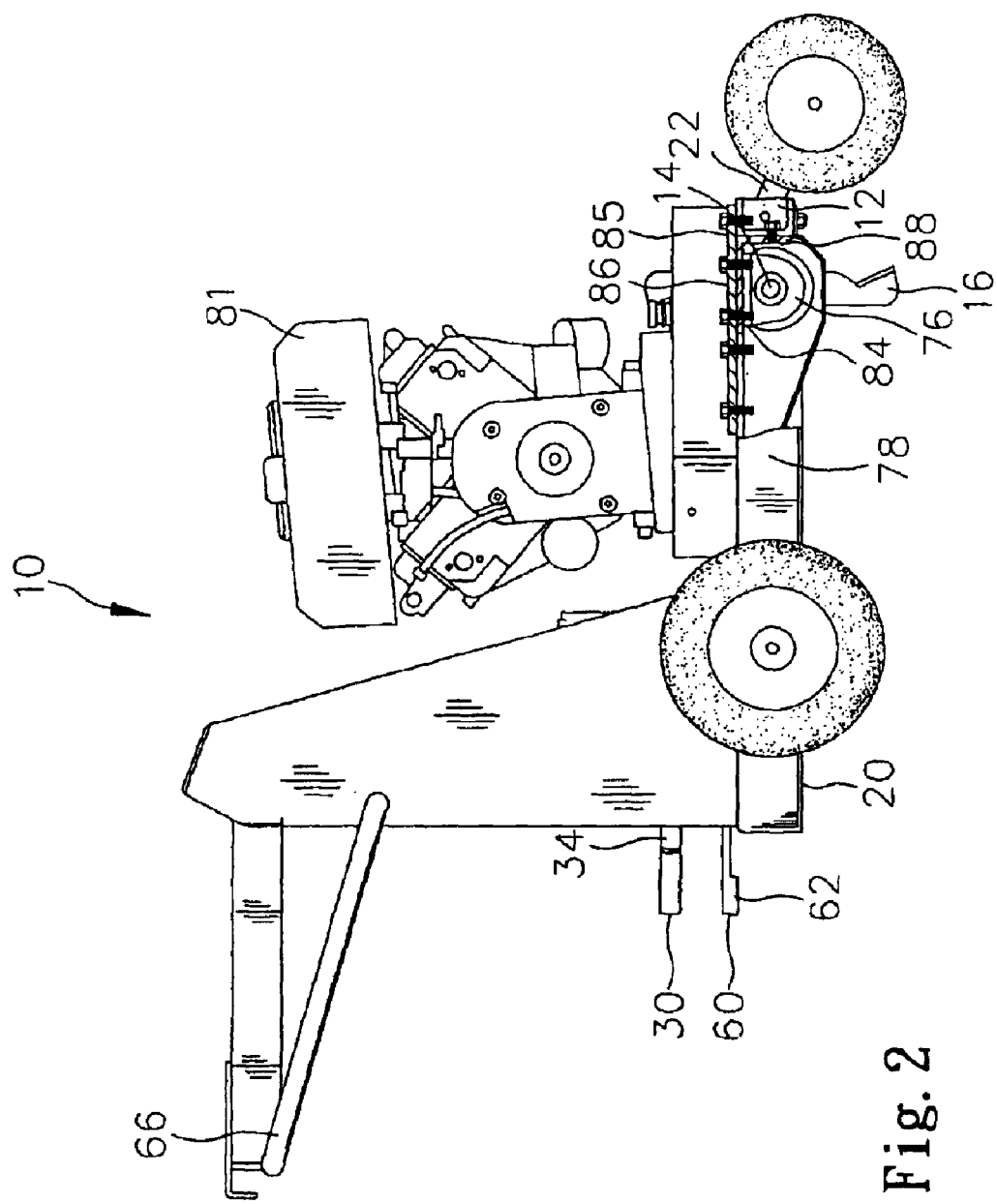
FIG. 2 shows an enlarged view of the bearing support of the saw of FIG. 1.
Figure 3:
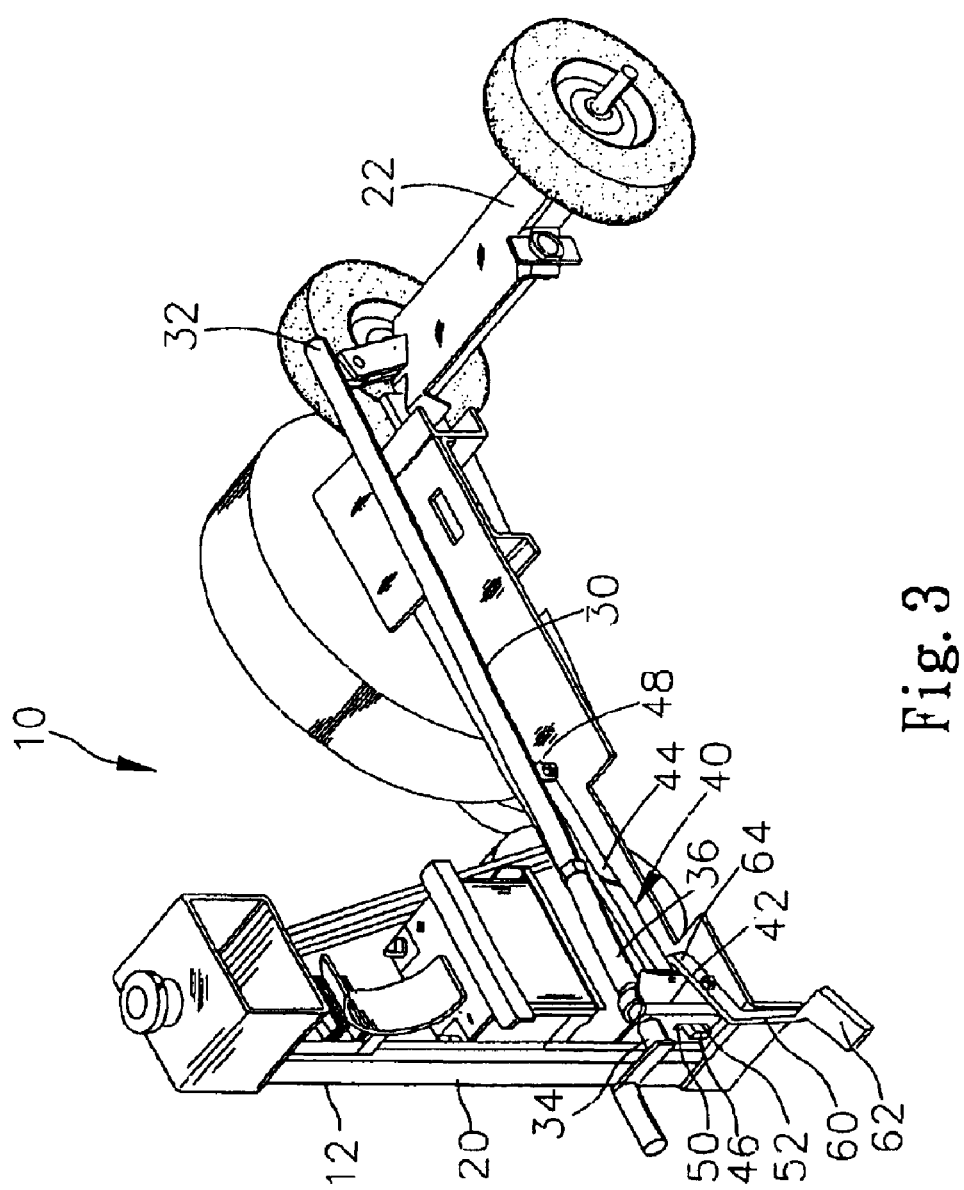
FIG. 3 shows a partial perspective view of a saw in a transport position according to the preferred teachings of the present invention.
Figure 4:
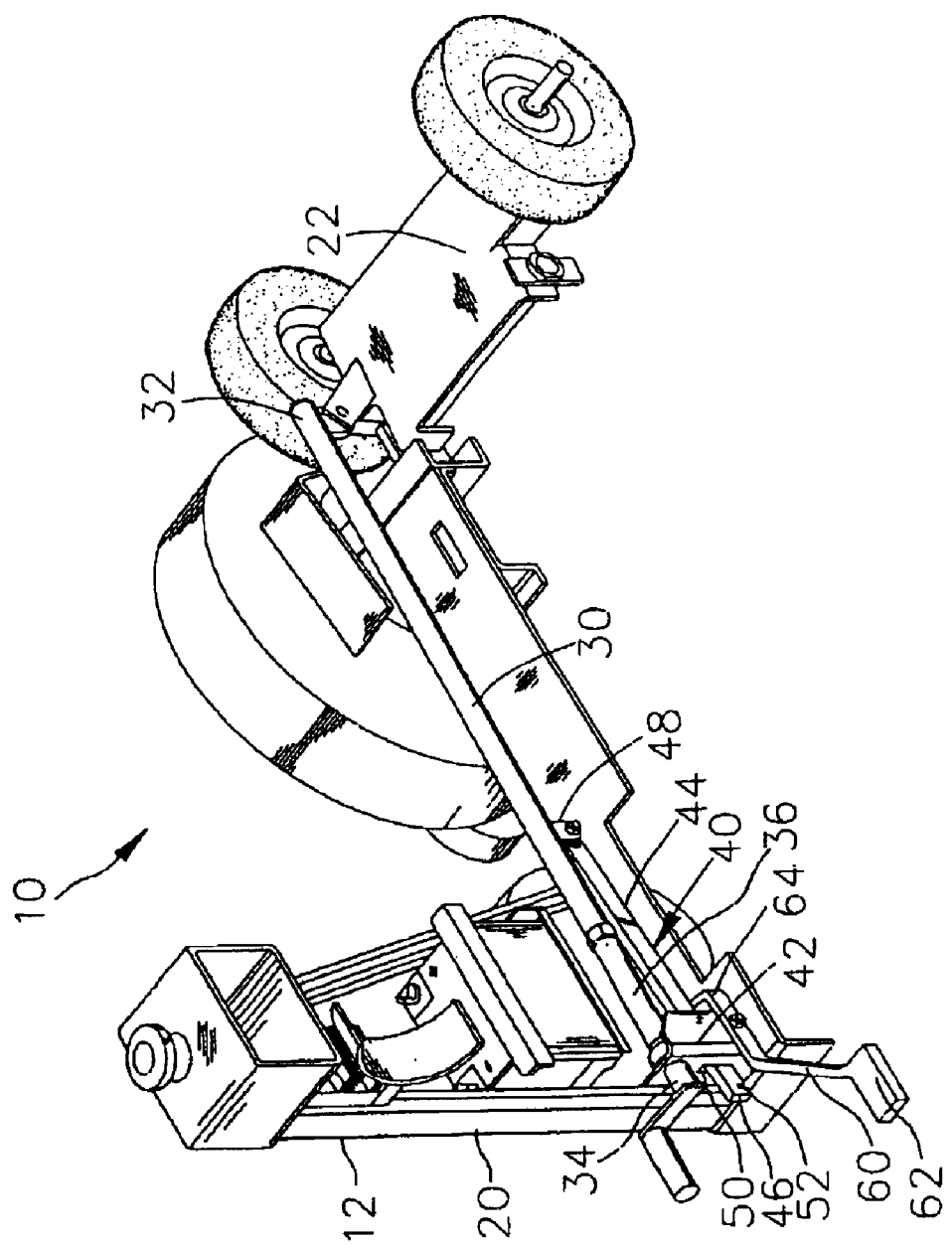
FIG. 4 shows a partial perspective view of the saw of FIG. 3 in a working position according to the preferred teachings of the present invention.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "surface," "end," "first," "second," "axis," "length," "width," and similar terms are used herein, it should be understood that these terms have reference only to the structure shown in the drawings as it would appear to a person viewing the drawings and are utilized only to facilitate describing the illustrative embodiment.

DESCRIPTION OF THE PREFERRED EMBODIMENT

A saw, constructed according to the preferred teachings of the present invention, is shown in the drawings and generally designated 10. In the most preferred form, the saw 10 is utilized to cut roofing when it is desired to remove roofing from a roof. The saw 10 includes a frame 12 that is mobile and a shaft 14 that is rotatably mounted on the frame 12. The shaft 14 rotates about a central axis, and a saw blade 16 is attached to the shaft 14. In the preferred form according to the teachings of the present invention, a second saw blade 18 is attached to the shaft 14.

In the preferred form according to the teachings of the present invention, the frame 12 includes a main framework 20 and a transport framework 22 that is pivotable about an axis in relation to the main framework 20 for adjustment of the frame 12 between a working position and a transport position. In the preferred form according to the teachings of the present invention, the saw blade 16 and the second saw blade 18 are positioned to contact and cut a work surface when the frame 12 is adjusted to the working position. In the preferred form according to the teachings of the present invention, the frame 12 is positioned to hold the saw blade 16 and the second saw blade 18 away from the work surface such that no cutting is done when the frame 12 is adjusted to the transport position.

In the preferred form according to the teachings of the present invention, an adjustment rod 30 extends between the transport framework 22 and the main framework 20. The adjustment rod 30 has a pivot end 32 pivotally connected to the transport framework 22 about an axis parallel to and spaced from the axis between the frameworks 20 and 22. The adjustment rod 30 further includes a sliding end 34 slideably connected to the main framework 20. The pivot end 32 causes the adjustment rod 30 to move interdependently with the movement of the transport framework 22. The sliding end 34 slides in contact with the main framework 20. In the most preferred form according to the teachings of the present invention, an adjustment component 36 is included which controls a height of the saw blades 16 and 18 when the frame 12 is in the working position. The height of the saw blades 16 and 18 controls a depth of cut of the saw blades 16 and 18.

In the preferred form according to the teachings of the present invention, a locking mechanism 40 is provided to hold the frame 12 in the transport position. In the most preferred form according to the teachings of the present invention, the locking mechanism 40 includes a locking plate 42, that is part of the main framework 20, and an elongated member 44. The elongated member 44 has a first end 46 in slideable contact with the locking plate 42 of the main framework 20 and lockable to the locking plate 42. In the most preferred form according to the teachings of the present invention, the elongated member 44 has a second end 48 that is pivotably attached to the adjustment rod 30 intermediate the pivot end 32 and the sliding end 34 and about an axis parallel to but spaced from the axis between the frameworks 20 and 22 and the axis of the pivot end 32. When the elongated member 44 is locked to the locking plate 42 of the main framework 20, the elongated member 44 stops the adjustment rod 30 from sliding relative to the main framework 20 and thereby locks the frame 12 into the transport position. In the most preferred form according to the teachings of the present invention, the locking plate 42 includes a slot 50 through which the first end 46 of the elongated member 44 slides. In the most preferred form according to the teachings of the present invention, the first end 46 of the elongated member 44 has a notch 52 that catches in the slot 50 of the locking plate 42 to lock the frame 12 into the transport position.

In the most preferred form according to the teachings of the present invention, a release lever 60 is provided and has a contact plate 62 and a lift arm 64. The release lever 60 is pivotally mounted to the main framework 20 about an axis intermediate the contact plate 62 and the lift arm 64 and spaced but parallel to the axis between the frameworks 20 and 22, and the axes of the pivot end 32 and the second end 48 and perpendicular to the elongated member 44. The contact plate 62 is accessible exterior from the main framework 20. When the contact plate 62 of the release lever 60 is actuated, the lift arm 64 pushes against the elongated member 44 to disengage the notch 52 of the elongated member 44 from the locking plate 42. Disengagement of the notch 52 allows the elongated member 44, and thus the adjustment rod 30, to slide relative to the main framework 20 causing the frame 12 to be unlocked and moveable to the working position.

In the most preferred form according to the teachings of the present invention, the adjustment rod 30 is generally parallel to the work surface, and the release lever 60 is located between the adjustment rod 30 and the work surface to allow the contact plate 62 to be close to the work surface and actuated by an operator's foot, thereby leaving the operator's hands available for holding and controlling the saw 10. In the preferred form, the adjustment rod 30 being parallel to the work surface allows compact arrangement of the saw 10, and the locking mechanism 40 attached to the adjustment rod 30 facilitates ease of locking and unlocking the frame 12.

In the most preferred form according to the teachings of the present invention, a handlebar 66 is attached to the main framework 20 of the frame 12 for grasping by an operator operating the saw 10. The handle bar 66 can be utilized to facilitate adjustment of the frame 12 between the working position and the transport position. In the most preferred form according to the teachings of the present invention, pressing down on the handlebar 66 lifts up on the transport framework 22 causing sliding of the sliding end 34 of the adjustment rod 30 and the first end 46 of the elongated member 44 towards the transport framework 22 until the notch 52 of the elongated member 44 catches on the slot 50 of the locking plate 42 to lock the frame 12 in the transport position. In the most preferred form, the handlebar 66 in combination with the locking mechanism 40 and the contact plate 62 actuated by the operator's foot allows the operator to operate the saw 10 while continuously grasping the handlebar 66 for ease of operation and greater control of the saw 10.

As will be recognized by those skilled in the art, the saw 10 according to the teachings of the present invention could be utilized without the handlebar 66, or the handlebar 66 could be utilized in cooperation with a second handlebar, without departing from the spirit or scope of the present invention.

According to the preferred teachings of the present invention, the shaft 14 has an access end 70 and another end 72 along an axial length and is mounted to the frame 12 by a first bearing 74 and a second bearing 75. In the preferred form according to the teachings of the present invention, the first bearing 74 is located near the other end 72 of the shaft 14 and the first bearing 74 and the second bearing 75 cooperate to support the shaft 14 while allowing rotational movement of the shaft 14 around the central axis and holding the shaft 14 otherwise stationary in relation to the frame 12. In the preferred form according to the teachings of the present invention, a third bearing 76 is mounted on the access end 70 of the shaft 14. The second bearing 75 is located intermediate the first bearing 74 and the third bearing 76, and the saw blade 16 and the second saw blade 18 are mounted on the shaft 14 radially outward of the first and third bearings 74 and 76. In the preferred form according to the teachings of the present invention, a pulley 77 is mounted on the shaft 14 between the second bearing 75 and the third bearing 76.

In the preferred form according to the teachings of the present invention, the frame 12 has an exterior edge 78 proximate the access end 70 of the shaft 14, and the frame 12 has a hole 79 proximate the pulley 77. The hole 79 in the frame 12 allows a drive belt 80 to pass through the hole 79 to connect the pulley 77 to a drive such as an engine 81. In the preferred form according to the teachings of the present invention, the frame 12 also has a gap 84 near the third bearing 76. The gap 84 extends from the hole 79 to the exterior edge 78 of the frame 12 and communicates the hole 79 to the exterior edge 78. In the preferred form according to the teachings of the present invention, a bearing support 85 is removably and replaceably mounted to the frame 12 to span the gap 84. The third bearing 76 is mounted to the bearing support 85. When the bearing support 85 is removed from the frame 12 the third bearing 76 has no attachments to the frame 12. The gap 84 in the frame 12 has a size and shape to allow the drive belt 80 to be passed around the access end 70 of the shaft 14 and over the third bearing 76 and into the hole 79 when the bearing support 85 is removed from the frame 12 and the second saw blade 18 is removed from the access end 70 of the shaft 14. The gap 84 allows replacement of the drive belt 80 by removing the second saw blade 18 from the shaft 14 and the bearing support 85 from the frame 12 without necessitating removal of the third bearing 76 from the shaft 14 and while the first bearing 74 and the second bearing 75 remain in place on the frame 12 and on the shaft 14.

In the most preferred form according to the teachings of the present invention, the bearing support 85 is formed from an upper bar 86 and a lower bar 88. The upper bar 86 is flat and extends across the gap 84 to attach to the frame 12 in a first plane parallel to the central axis of the shaft 14 and generally parallel to the work surface. The lower bar 88 is L-shaped to undergird the upper bar 86 in the first plane while attaching to the frame 12 in a second plane parallel to the central axis of the shaft 14 and perpendicular to the first plane and generally perpendicular to the work surface. In the most preferred form, according to the teachings of the present invention, the upper bar 86 and the lower bar 88 are attached to the frame 12 by bolts. As will be recognized by those skilled in the art, alternate forms of the bearing support 85 including, but not limited to, a single formed bracket, or the like, may be used without departing from the spirit or scope of the present invention.

In the preferred form according to the teachings of the present invention, the pulley 77 is attached to the shaft 14 for connection to the drive belt 80, which mechanically links the engine 81 to the shaft 14 to cause rotation of the saw blade 16 and the second saw blade 18 mounted upon the shaft 14 axially outward of the bearings 74 and 76. In the preferred form according to the teachings of the present invention, the engine 81 is movable towards and away from the shaft 14 to facilitate drive belt replacement and tensioning.

Now that the basic teachings of the present invention have been explained, many extensions and variations will be obvious to one having ordinary skill in the art. For example, although the saw 10 according to the preferred teachings of the present invention has been shown as including several features in combination believed to produce synergistic results, such features can be utilized singly and in other combinations with other features according to the teachings of the present invention. For example, although, according to the teachings of the present invention, the saw 10 with the locking mechanism 40, the release lever 60, and removability of the bearing support 85 in combination provides ease of operation with minimal downtime, the saw 10 may be used with the bearing support 85 being removable and with the locking mechanism 40 without the release lever 60. Likewise, the saw 10 may be used with the bearing support 85 being removable and replaceable for access to the pulley 77 without utilizing the locking mechanism 40 on the frame 12 according to the teachings of the present invention. Similarly, the saw 10 may be used with the locking mechanism 40 without the bearing support 85 being removable according to the teachings of the present invention.

Furthermore, while in the most preferred form the saw 10 utilizes both the saw blade 16 and the second saw blade 18, the saw 10 could utilize one of the saw blades 16 and 18 singly without departing from the spirit or scope of the present invention.

Thus since the invention disclosed herein may be embodied in other specific forms without departing from the spirit of general characteristics thereof, some of which forms have been indicated, the embodiments described herein are to be considered in all respects illustrative and not restrictive. The scope of the invention is to be indicated by the appended claims, rather than by the foregoing description, and all changes, which come within the meaning, and ranges of equivalency of the claims are intended to be embraced therein.

What is claimed is:

1. Saw comprising, in combination:
a frame, wherein the frame is mobile on a work surface and includes a main framework and a transport framework, with the transport framework being pivotably moveable relative to the main framework, with the frame being adjustable between a working position and a transport position by pivotal movement of the transport framework relative to the main framework;
an adjustment rod having a pivot end and a sliding end, with the pivot end being pivotably connected to the transport framework and the sliding end being slideably connected to the main framework, with sliding movement of the sliding end of the adjustment rod being interdependent with pivotal movement of the transport framework relative to the main framework;
a locking mechanism including an elongated member, with the elongated member having a first end and a second end, with the second end of the elongated member pivotably connected to the adjustment rod intermediate the pivot end and the sliding end of the adjustment rod, with the first end of the elongated member being slideable and lockable to the main framework, with sliding of the first end of the elongated member relative to the main framework allowing movement of the adjustment rod, with locking of the first end of the elongated member to the main framework stopping sliding movement of the adjustment rod and locking the frame into the transport position;

a shaft rotatably mounted to the frame about a central axis, with the shaft having an axial length, an access end and another end along the axial length;

a pulley mounted on the shaft for connection with a drive belt, with the frame having a hole proximate the pulley, with the drive belt passing through the hole in the frame to connect the pulley to a drive;

a first bearing and a second bearing mounted to the frame and supporting the shaft, with the first bearing located proximate the other end of the shaft, with the shaft free to rotate about the central axis, and with the first bearing and the second bearing cooperating to hold the shaft otherwise stationary relative to the frame;

a third bearing located on the access end of the shaft, with the second bearing located intermediate the third bearing and the first bearing, with the pulley located intermediate the third bearing and the second bearing;

a bearing support removably and replaceably mounted to the frame, with the frame having an exterior edge proximate the access end of the shaft, with the frame having a gap proximate the access end of the shaft, with the gap extending from the hole in the frame to the exterior edge of the frame and communicating the hole with the exterior edge, with the bearing support spanning the gap when mounted to the frame, with the third bearing attached to the bearing support, wherein when the bearing support is removed from the frame, the third bearing remains in position on the shaft and is void of attachments to the frame, with the gap in the frame being of a size and shape to allow the drive belt to be passed around the access end of the shaft and over the third bearing and into the hole when the bearing support is removed from the frame and while the first, second and third bearings remain in position on the shaft and the first and second bearings remain mounted on the frame, with the gap providing access to the pulley and ease of replacement of the drive belt; and a saw blade mounted on the shaft, with the saw blade engaging the work surface when the frame is in the working position and with the saw blade positioned to prevent engagement with the work surface when the frame is in the transport position, with rotation of the shaft causing rotation of the saw blade.

2. Saw comprising, in combination:

a frame, wherein the frame is mobile on a work surface and includes a main framework and a transport framework, with the transport framework being pivotably moveable relative to the main framework, with the frame being adjustable between a working position and a transport position by pivotal movement of the transport framework relative to the main framework;

an adjustment rod having a pivot end and a sliding end, with the pivot end being pivotably connected to the transport framework and the sliding end being slideably connected to the main framework, with sliding movement of the sliding end of the adjustment rod being interdependent with pivotal movement of the transport framework relative to the main framework;

a locking mechanism including an elongated member, with the elongated member having an first end and a second end, with the second end of the elongated member pivotably connected to the adjustment rod intermediate the pivot end and the sliding end of the adjustment rod, with the first end of the elongated member being slideable and lockable to the main framework, with sliding of the first end of the elongated member relative to the main framework allowing movement of the adjustment rod, with locking of the first end of the elongated member to the main framework stopping sliding movement of the adjustment rod and locking the frame into the transport position;

a shaft rotatably mounted to the frame; and a saw blade mounted on the shaft, with the saw blade engaging the work surface when the frame is in the working position and with the saw blade positioned to prevent engagement with the work surface when the frame is in the transport position, with rotation of the shaft causing rotation of the saw blade.

3. The saw of claim 2 with an engine mechanically linked to the shaft and driving the shaft to cause rotation of the saw blade.

4. The saw of claim 2 further comprising, in combination: a handlebar attached to the frame to facilitate adjustment of the frame between the working position and the transport position.

5. The saw of claim 2 further comprising, in combination: an adjustment component controlling a height of the saw blade, with the height of the saw blade defining a depth of cut of the saw blade when the frame is in the working position.

6. The saw of claim 2 with a second saw blade mounted on the shaft, with the second saw blade engaging the work surface when the frame is in the working position and with the second saw blade positioned to prevent engagement with the work surface when the frame is in the transport position, with rotation of the shaft causing rotation of the second saw blade.

7. The saw of claim 2 with the main framework further comprising, in combination: a locking plate, with the locking plate including a slot, with the first end of the elongated member slideably passing through the slot, with the first end of the elongated member including a notch corresponding to the slot, with the first end of the elongated member being locked to the main framework by the notch engaging the slot to lock the frame into the transport position.

8. The saw of claim 7 further comprising, in combination: a release lever including a contact plate and a lift arm, with the release lever pivotally mounted to the main framework about an axis intermediate the contact plate and the lift arm and perpendicular to the elongated member, with the contact plate being accessible exterior from the main framework, with the lift arm being in contact with the elongated member, with actuation of the contact plate causing the lift arm to displace the elongated member and effect disengagement of the notch of the elongated member from the slot in the locking plate, with the frame being unlocked and moveable to the working position when the elongated member is disengaged from the locking plate.

9. The saw of claim 8 further comprising, in combination: an adjustment component controlling a height of the saw blade, with the height of the saw blade defining a depth of cut of the saw blade when the frame is in the working position.

10. The saw of claim 9 further comprising, in combination:
- a handlebar attached to the frame to facilitate adjustment of the frame between the working position and the transport position; and
- an engine mechanically linked to the shaft and driving the shaft to cause rotation of the saw blade.

11. Saw comprising, in combination:
- a frame, wherein the frame is mobile on a work surface;
- a shaft rotatably mounted to the frame about a central axis, with the shaft having an axial length, an access end and another end along the axial length;
- a pulley mounted on the shaft for connection with a drive belt, with the frame having a hole proximate the pulley, with the drive belt passing through the hole in the frame to connect the pulley to a drive;
- a first bearing and a second bearing mounted to the frame and supporting the shaft, with the first bearing located proximate the other end of the shaft, with the shaft free to rotate about the central axis, and with the first bearing and the second bearing cooperating to hold the shaft otherwise stationary relative to the frame;
- a third bearing located on the access end of the shaft, with the second bearing located intermediate the third bearing and the first bearing, with the pulley located intermediate the third bearing and the second bearing;
- a bearing support removably and replaceably mounted to the frame, with the frame having an exterior edge proximate the access end of the shaft, with the frame having a gap proximate the access end of the shaft, with the gap extending from the hole in the frame to the exterior edge of the frame and communicating the hole with the exterior edge, with the bearing support spanning the gap when mounted to the frame, with the third bearing attached to the bearing support, wherein when the bearing support is removed from the frame, the third bearing remains in position on the shaft and is void of attachments to the frame, with the gap in the frame being of a size and shape to allow the drive belt to be passed around the access end of the shaft and over the third bearing and into the hole when the bearing support is removed from the frame and while the first, second and third bearings remain in position on the shaft and the first and second bearings remain mounted on the frame, with the gap providing access to the pulley and ease of replacement of the drive belt; and
- a saw blade mounted on the shaft, with rotation of the shaft causing rotation of the saw blade.

12. The saw of claim 11 with the drive comprising an engine mounted on the frame and linked by the drive belt to the shaft to drive the shaft causing rotation of the saw blade, with the engine being movable towards and away from the shaft to facilitate drive belt replacement and tensioning.

13. The saw of claim 11 further comprising, in combination: an adjustment component controlling a height of the saw blade, with the height of the saw blade defining a depth of cut of the saw blade when the frame is in the working position.

14. The saw of claim 11 further comprising, in combination: a second saw blade mounted on the shaft, with rotation of the shaft causing rotation of the second saw blade.

15. The saw of claim 11 with the bearing support comprising, in combination: an upper bar and a lower bar, with the upper bar being flat and extending across the gap and attaching to the frame in a first plane parallel to the central axis of the shaft, with the lower bar being L-shaped to undergird the upper bar while attaching to the frame in a second plane parallel to the central axis of the shaft and perpendicular to the first plane, with the upper bar and the lower bar being attached to the frame by bolts.

16. The saw of claim 11 with the frame further including a main framework and a transport framework, with the transport framework being moveable relative to the main framework, with the frame being adjustable between a working position and a transport position by movement of the transport framework relative to the main framework, with the saw blade engaging the work surface when the frame is in the working position and with the saw blade being positioned to prevent engagement with the work surface when the frame is in the transport position.

17. The saw of claim 16 further comprising, in combination: a handlebar attached to the frame to facilitate adjustment of the frame into the working position and the transport position.

18. The saw of claim 17 further comprising, in combination:
- an adjustment rod having a pivot end and a sliding end, with the pivot end being pivotably connected to the transport framework and the sliding end being slideably connected to the main framework, with sliding movement of the sliding end of the adjustment rod being interdependent with pivotal movement of the transport framework relative to the main framework; and
- a locking mechanism including an elongated member, with the elongated member having an first end and a second end, with the second end of the elongated member pivotably connected to the adjustment rod intermediate the pivot end and the sliding end of the adjustment rod, with the first end of the elongated member being slideable and lockable to the main framework, with sliding of the first end of the elongated member relative to the main framework allowing movement of the adjustment rod, with locking of the first end of the elongated member to the main framework stopping sliding movement of the adjustment rod and locking the frame into the transport position.

19. The saw of claim 18 with the main framework having a locking plate, with the locking plate including a slot, with the first end of the elongated member slideably passing through the slot, with the first end of the elongated member including a notch corresponding to the slot, with the first end of the elongated member being locked to the main framework by the notch engaging the slot to lock the frame into the transport position; and with the saw further comprising, in combination:
- a release lever including a contact plate and a lift arm, with the release lever pivotally mounted to the main framework about an axis intermediate the contact plate and the lift arm and perpendicular to the elongated member, with the contact plate being accessible exterior from the main framework, with the lift arm being in contact with the elongated member, with actuation of the contact plate causing the lift arm to displace the elongated member and effect disengagement of the notch of the elongated member from the slot in the locking plate, with the frame being unlocked and moveable to the working position when the elongated member is disengaged from the locking plate.

20. The saw of claim 19 with the bearing support comprising, in combination: an upper bar and a lower bar, with the upper bar being flat and extending across the gap and attaching to the frame in a first plane parallel to the central axis of the shaft, with the lower bar being L-shaped to undergird the upper bar while attaching to the frame in a second plane parallel to the central axis of the shaft and perpendicular to the first plane, with the upper bar and the lower bar being attached to the frame by bolts.

* * * * *